(12) United States Patent
Mo et al.

(10) Patent No.: US 7,852,526 B2
(45) Date of Patent: Dec. 14, 2010

(54) SEPARATOR

(75) Inventors: Jiangxiao Mo, Vancouver, WA (US); Kelly A. Brock, Battle Ground, WA (US); Stephen Tse Deng, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1265 days.

(21) Appl. No.: 11/413,739

(22) Filed: Apr. 28, 2006

(65) Prior Publication Data

US 2007/0253037 A1   Nov. 1, 2007

(51) Int. Cl.
*H04N 1/04* (2006.01)
(52) U.S. Cl. .................. 358/498; 358/474; 358/496; 358/497; 271/121; 271/167; 399/367
(58) Field of Classification Search .......... 358/474, 358/498, 496, 486, 497; 271/117, 116, 109, 271/9.01, 167, 110, 215, 121, 122, 124; 399/410, 407
See application file for complete search history.

(56) References Cited

U.S. PATENT DOCUMENTS

| | | | | |
|---|---|---|---|---|
| 3,136,539 A | * | 6/1964 | Lyman | 271/97 |
| 4,544,147 A | * | 10/1985 | Dinnissen | 271/35 |
| 5,114,134 A | | 5/1992 | Rasmussen et al. | |
| 5,116,034 A | | 5/1992 | Trask et al. | |
| 5,255,905 A | * | 10/1993 | Reid et al. | 271/94 |
| 5,269,506 A | | 12/1993 | Olson et al. | |
| 5,316,285 A | | 5/1994 | Olson et al. | |
| 5,350,168 A | * | 9/1994 | Sheridan | 271/122 |
| 5,537,227 A | | 7/1996 | Samii et al. | |
| 5,549,289 A | | 8/1996 | Sonnenburg et al. | |
| 5,553,842 A | | 9/1996 | Wilcox et al. | |
| 5,570,876 A | | 11/1996 | Samii | |
| 5,615,874 A | | 4/1997 | Parthasarathy et al. | |
| 5,655,762 A | | 8/1997 | Yergenson | |
| 5,764,384 A | | 6/1998 | Wilcox et al. | |
| 5,882,004 A | | 3/1999 | Padget | |
| 5,947,466 A | | 9/1999 | Romine | |
| 6,009,302 A | | 12/1999 | Worley et al. | |
| 6,082,729 A | | 7/2000 | Padget | |
| 6,135,444 A | | 10/2000 | Padget | |
| 6,139,007 A | | 10/2000 | Cahill | |
| 6,151,140 A | | 11/2000 | Wilcox et al. | |
| 6,257,569 B1 | | 7/2001 | Rhodes et al. | |
| 6,279,897 B1 | | 8/2001 | Richards | |
| 6,315,282 B2 | | 11/2001 | Chua et al. | |

(Continued)

OTHER PUBLICATIONS

*Milling Cutter Nomenclature—A written and pictorial definition of the basic nomenclature of a milling cutter*, New Concepts in Milling Handbook, 1973 Niagara Cutter Inc., printed from internet Nov. 9, 2005, www.niagaracutter.com/techinfo/millhandbook/nomenclature (3 pages).

(Continued)

*Primary Examiner*—Negussie Worku

(57) ABSTRACT

In one embodiment, a sheet separator includes a bias that resiliently biases a first sheet engaging surface in a direction away from a second surface, wherein the second surface engages the edge of sheets upon movement of the first surface. In one embodiment, a method applies opposite forces to a stack of sheets, wherein one of the opposite forces varies based upon a characteristic of the sheets.

18 Claims, 4 Drawing Sheets

U.S. PATENT DOCUMENTS

| | | | |
|---|---|---|---|
| 6,322,065 B1 | 11/2001 | Underwood et al. | |
| 6,433,897 B1 | 8/2002 | Wilcox et al. | |
| 6,523,820 B2 * | 2/2003 | Gustafson et al. | 271/10.01 |
| 6,637,743 B2 | 10/2003 | Underwood et al. | |
| 6,651,973 B2 | 11/2003 | Gaarder et al. | |
| 6,663,098 B2 | 12/2003 | Teo et al. | |
| 6,764,072 B2 | 7/2004 | Gaarder | |
| 6,866,259 B2 | 3/2005 | Underwood et al. | |
| 6,874,779 B2 * | 4/2005 | Park | 271/121 |
| 6,932,529 B2 | 8/2005 | Richtsmeier et al. | |
| 7,036,814 B2 * | 5/2006 | Oh et al. | 271/121 |
| 7,300,047 B2 * | 11/2007 | Baum et al. | 271/8.1 |
| 7,455,288 B2 * | 11/2008 | Ruhe et al. | 271/124 |
| 7,484,725 B2 * | 2/2009 | Ueda et al. | 271/121 |
| 7,513,495 B2 * | 4/2009 | Mo | 271/121 |
| 2003/0038419 A1 * | 2/2003 | Kawai et al. | 271/18 |
| 2004/0245703 A1 * | 12/2004 | Yun et al. | 271/110 |
| 2004/0251602 A1 * | 12/2004 | Ruhe et al. | 271/167 |
| 2006/0087069 A1 * | 4/2006 | Takeuchi et al. | 271/121 |

OTHER PUBLICATIONS

*Tooth Type*, Morse Industrial Band Saws, printed from internet Nov. 9, 2005, www.independenceband.com/tooth_type (2 pages).

*About Blades*, Bandsaw Blade Geometry, printed from internet Nov. 9, 2005, www.harrisonsaw.co.uk/blades/geo.asp (3 pages).

*Glossary of Saw Terminology*, Online Reference of Disston Saws—Glossary of Saw Terms, printed from internet Nov. 9, 2005 www.disstonianinstitute.com/glossary (4 pages).

\* cited by examiner

SEPARATOR

BACKGROUND

In some media interaction systems, such as printers, copiers and scanners, sheets of media are sometimes fed from a stack. During feeding, multiple sheets may sometimes not separate, causing jams, multi-picks or other media handling errors.

DETAILED DESCRIPTION OF EXAMPLE EMBODIMENTS

Figure 1:
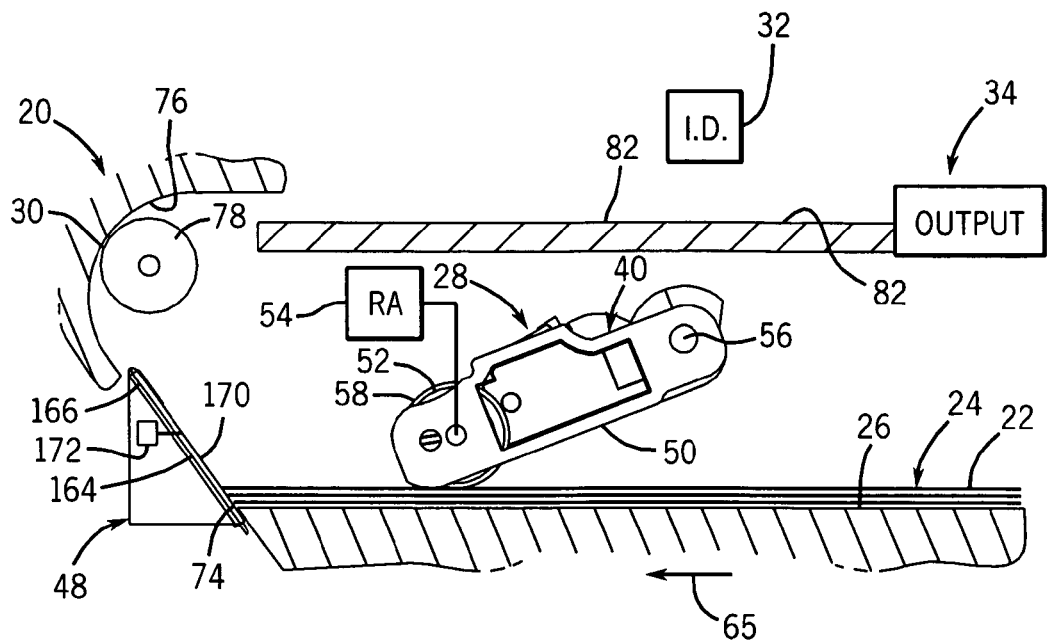
FIG. 1 is a side elevational view schematically illustrating one example of a media interaction system according to an example embodiment.

FIG. 1 schematically illustrates one example of a media interaction system 20 configured to interact with individual sheets 22 of media provided from a stack 24 of such sheets 22. As will be described in detail hereafter, media interaction system may be less prone to media handling errors caused by multi-picks and mispicks of individual sheets 22. Media interaction system 20 generally includes media support surface 26, media pick system 28, media path 30, interaction device 32 and output 34. Media support surface 26 comprises one or more structures or surfaces configured to support stack 24 of media sheets 22. In one embodiment, media support surface 26 may be provided as part of a fixed tray, a removable tray, a bin or other platform upon which stack 24 may rest. Although media support surface 26 is illustrated as having a substantially horizontal orientation, in other embodiments, media support surface 26 may be inclined or declined.

Media pick system 28 comprises an arrangement of components configured to pick a top or outermost sheet 22 of stack 24 and to move the picked sheet towards and into media path 30. Media pick system 28 includes pick device 40 and separator 48. Pick device 40 comprises a device generally extending opposite to media support surface 26 and configured to engage one or more outermost or topmost sheets 22 from stack 24 and to move such sheets 22 towards and along separator 48. In the particular example illustrated, the media pick device includes arm 50, roller 52 and rotary actuator 54. Arm 50 comprises an elongate structure configured to pivot about axis 56 while rotatably supporting roller 52. Roller 52 comprises a cylindrical member having an outer circumferential surface 58 in frictional engagement with the top or outermost sheet 22a of stack 24. Rotary actuator 54 (schematically shown) comprises a device, such as a motor, operably coupled to roller 52 so as to rotatably drive roller 52 to move sheet 22a towards and along separator 48. In other embodiments, pick device 40 may comprise other devices or structures configured to engage and move sheets 22 from stack 24.

Figure 2:
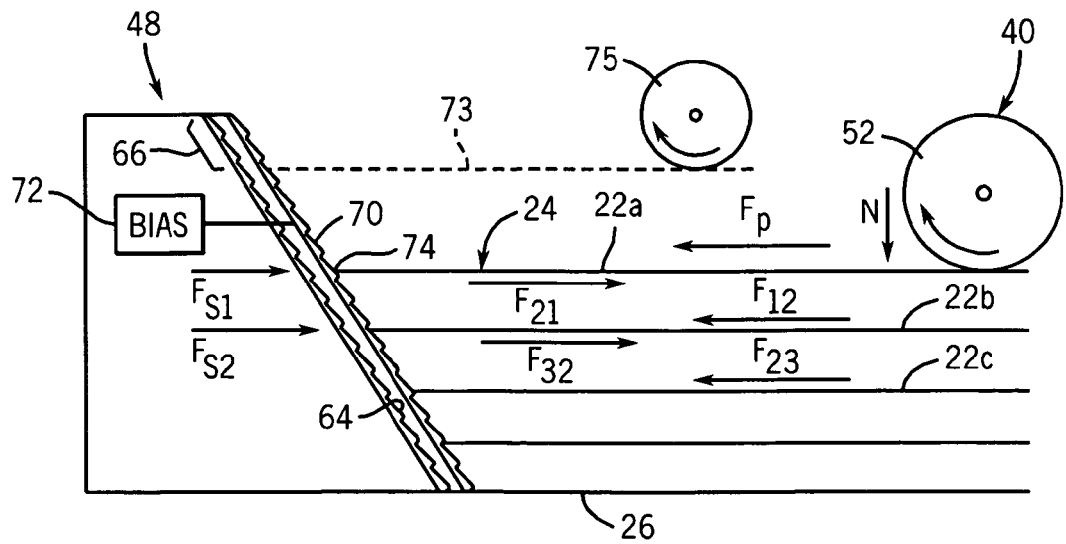
FIG. 2 is an enlarged fragmentary side elevational view dramatically illustrating one example of a separator of the system of FIG. 1 according to an example embodiment.

As shown by FIGS. 1 and 2, underlying adjacent sheet 22b may also adhere to sheet 22a and can also be moved from stack 24 towards separator 48 and towards media path 30. Separator 48 comprises an apparatus configured to facilitate separation of sheets 22a from 22b so as to permit sheet 22a to be moved further along media path 30, avoiding a mispick (i.e., when no sheets 22 are picked), and to inhibit further movement of sheet 22b along media path 30 so as to avoid a multi-pick (i.e., when more than one sheet is picked).

As shown by FIG. 2, separator 48 includes surfaces 64, 66, 70 and bias 72. Surface 64 extends along a face of separator 48 generally nonparallel to media support surface 26. Surface 64 extends generally behind or rearward of surface 70 prior to movement of surface 70. Surface 64 is located so as to engage, contact or abut leading edges 74 of sheets 22 upon movement of surface 70 when sheets 22 are moved along surface 26 in the direction indicated by arrow 65 (shown in FIG. 1) as a result of manual force or as a result of force applied by pick device 40. In one embodiment, surface 64 extends substantially proximate to media support surface 26. In other embodiments, surface 64 may be spaced vertically above media support surface 26.

In the particular example illustrated, surface 64 extends at an obtuse angle with respect to media support surface 26 which may help create resistance or friction to stop $2^{nd}$ sheet 22b moving into paper path but still allow the top sheet 22a to be picked. It is also to stage or fan the leading edges 74 of sheets 22 of stack 24 along surface 64 to enhance subsequent separation of such sheets. In one embodiment, surface 64 is inclined at an angle of at least about 45 degrees and less than 90 degrees such that surface 64 is angularly spaced from media support surface 26 greater than 90 degrees and less than or equal to about 105 degrees. In one embodiment, surface 64 is angularly spaced from media support surface 26 by about 120 degrees. In still other embodiments, surface 64 may be angularly spaced from media support surface 26 by other angles.

Surface 64 is configured to engage leading edges 74 sheets 22 to assist surface 70 in reducing the likelihood of a multi-pick. In one embodiment, surface 64 includes one or more surface irregularities such as roughened areas, grooves, texture, dimples, serrations or other surface treatments configured to enhance the degree of coefficient of friction that a surface has with respect to another surface such as leading edges 74 of sheets 22. In other embodiments, surface 64 may include one of more surfaces provided by compressible or elastomeric materials which have an enhanced coefficient of friction with leading edges 74 sheets 22. Surface 64 is configured such that upon movement of the surface 70 to a position coplanar or behind surface 64, leading edge 74 of sheet 22a rides up surface 64 under the force applied by pick device while sheet 22b remains held in part by surface 64. In the embodiment illustrated, surface 64 has a lower coefficient of friction with leading edges 74 of sheets 22 as compared to surface 70.

Surface 66 is similar to surface 64 except that surface 66 has a lower coefficient of friction with leading edges of media as compared to surface 64. For example, surface 66 may be less rough or smoother than surface 64. In one embodiment, surface 66 may have teeth or other surface irregularities that have reduced height as compared to those of surface 64. In another embodiment, surface 66 may have surface irregularities which have a lower density or are more greatly spaced apart as compared to those of surface 64.

Surface 66 is located above surface 64 and is configured to interact with leading edges of media supported above surface 64. For example, in the embodiment shown in FIG. 2, system 10 additionally includes an elevated media support surface 73 and an additional pick device 75. Media support surface 73 supports a stack of media distinct from the stack of media supported by media support surface 26 while media pick device 75 engages and drives the outermost or uppermost sheet to pick the outermost or topmost sheet from the stack. In the particular example illustrated, media support surface 73 is configured to support a stack of media, wherein the individual sheets have a lower coefficient of friction with one another or have a lower coefficient of friction with pick device 75, lessening the likelihood of a multi-pick and increasing the likelihood of a mispick. Because surface 66 has a reduced coefficient of friction with the leading edges of such media as compared to the coefficient of friction between surface 64 and the same media, mispicks are reduced. In one particular embodiment, surface 73 is configured to support a stack of photo media or photo paper.

In other embodiments, surface 66 may alternatively have a greater coefficient of friction with leading edges of media in those circumstances where the individual sheets have a higher coefficient of friction with one another or have a higher coefficient of friction with pick device 75, increasing the likelihood of a multi-pick and decreasing the likelihood of a mispick. Because separator 48 includes surfaces 64 and 66 having distinct coefficient of friction with leading edges of media, separator 48 may facilitate separation of multiple kinds of media supported by multiple support surfaces 26, 73. In other embodiments where media support surface 73 and media picked by 74 are omitted, such as shown in FIG. 1, surface 66 may be omitted.

Surface 70 comprises a movable surface along a face of separator 48 configured to contact and engage leading edge 74 of sheets 22. Surface 70 is movable between a first position in front of or forward of surfaces 64 and 66 and a second position substantially coplanar or rearward of surfaces 64 and 66.

Surface 70 has a coefficient of friction with leading edges 74 of sheets 22 that is larger than the coefficient of friction of surface 64 with leading edges 74 of sheets 22. As a result, surface 70 is more likely to retain sheet 22b against movement with sheet 22a as will be described in detail hereafter. In one embodiment, surface 70 is formed from an elastomeric or compressible material providing the appropriate coefficient of friction with leading edges 74 of sheets 22. In other embodiments, surface 70 may include surface irregularities. Examples of surface irregularities include roughened areas, grooves, texture, dimples, serrations or other surface treatments configured to enhance the degree of coefficient of friction that a surface has with respect to another surface such as leading edges 74 of sheets 22.

In the particular embodiment illustrated, surface 70 generally extends from proximate to media support surface 26 to a position at or above a height of a highest stack of media that may be supported by media support surface 26. In those embodiments in which system 10 additionally includes media support surface 73 as described above, surface 70 may additionally extend above media support surface 73 to engage sheets held by media support surface 73.

Bias 72 comprises one or more structures or mechanisms configured to resiliently bias surface 70 towards the forward position in which surface 70 extends beyond or in front of surfaces 64 and 66. In one embodiment, bias 72 may be provided by one or more or resilient spring-like structures integrally formed as part of a single unitary body with surface 70 or a structure supporting surface 70 provide surface 70 with resilient compliance. In other embodiments, bias 72 may comprise separate components, such as leaf springs, tension springs, compression springs and the like, connected between surface 70 and a stationary structure proximate to surface 70.

Bias 72 facilitates the application of different separation forces to sheets of media depending upon the characteristics of the sheets of media. Because bias 72 is spring loaded and automatically adjusts the separation forces that are applied to sheet to media based upon the characteristics of such sheets, fewer multi-picks and mispicks may result. For heavy or stiff media, the bias 72 moves backward to avoid the no pick but still giving constant separation resistance force to stop the multi-pick.

Media path 30 comprises a passage along which sheets 22 of media picked by pick system 28 travel to interaction device 32. In the particular example illustrated, media path 30 is formed by guide surface 76, roller 78 and platen 82. Guide surface 76 comprises a surface against which sheet 22 is moved. Roller 78 comprises a roller rotatably driven to drive media along guide surface 76. In other embodiments, media path 30 may be formed by other structures including other guide surfaces, additional rollers, belts or other arrangements configured to move media from media support surface 26 to interaction device 32.

Platen 82 comprises a surface configured to support media opposite to interaction device 32 as the media is interacted upon. Although platen 82 is illustrated as being horizontal and media guide surface 76 is illustrated as being arcuate, in other embodiments, media guide surface 76 and platen 82 may have other orientations and other shapes. In particular embodiments, platen 82 may be omitted.

Media interaction device 32 comprises a device configured to interact with a face of a sheet 22 generally positioned opposite to interaction device 32. In one embodiment, media interaction device 32 may comprise a printhead configured to eject fluid ink or other fluid material upon sheet 22. Examples of such printheads include thermoresistive printheads. In still other embodiments, media interaction device 32 may be configured to deposit toner or other printing material upon a face of a sheet 22. In yet other embodiments, media interaction device 32 may comprise a device configured to scan or read information, data, patterns and the like from the face of a sheet 22. In yet other embodiments, media interaction device 32 may be configured to interact with a sheet 22 of media in other fashions.

Output 34, schematically shown, comprises a tray, bin or other structure configured to receive sheets 22 once they have been interacted upon by interaction device 32. In one embodiment, output 34 may comprise a tray, bin and the like configured to store and provide a person access to interacted upon sheets. In yet other embodiments, output 34 may comprise other devices or mechanisms configured to further manipulate such sheets such as a duplexer and the like.

In operation, a stack of media is placed upon media support surface 26, wherein each of the sheets 22 of stack 24 extend substantially parallel to one another and parallel to media support surface 26. Arm 50 supports surface 58 of roller 52 in engagement with the top or outermost sheet 22a. Rotary actuator 54 rotatably drives roller 52 which is in frictional engagement with sheet 22a.

As shown in FIG. 2, roller 52 applies a pick force $F_p$ to sheet 22a. Friction between sheet 22a and the underlying sheet 22b resists picking of sheet 22a. Separator 48 also applies a separation forces $F_s$ to leading-edge 74 of sheet 22a which resists movement of sheet up along separator 48 to media path 30. To avoid a mispick, pick device 40 applies a pick force $F_p$ that is greater than the sum of the resistance force $F_{21}$ and the separation force $F_s$ applied by separator 48. In other words, $F_p > \mu_{21} * N + F_s$, where:
$F_p = \mu_r * N$;
$F_s = \mu_s * F_p$;
$\mu_s$=the coefficient of friction between leading edge of a sheet 22 and separator 48;
$\mu_r$=the coefficient of friction between roller 52 and sheet 22a;
N=the normal force applied to sheet 22a by roller 52;
$\mu_{21}$=the coefficient of friction between sheets 22a and 22b; and
$F_s$=the separtion force applied by separator 48.

To avoid a multi-pick, separator 48 applies a separation force $F_s$ that is greater than those forces tending to adhere sheets 22a and 22b together during a pick. In other words, the separation force $F_s$ is greater than $F_{12}-F_{32}$. Stated another way, $F_s > N(\mu_{12}-\mu_{32})$, where:
$F_s$=the force applied by separator 48, $\mu_s * F_p$;
N=the normal force applied to sheet 22a by roller 52;
$\mu_{12}$=the coefficient of friction between sheets 22a and 22b; and
$\mu_{32}$=the coefficient of friction between sheets 22b and 22c.

During picking of sheets, roller 52 generally applies a normal force N which is substantially the same for both low friction media such as thinner, lighter, flexible sheets of media and high friction media such as thicker, stiffer or heavier sheets of media. However, because surface 70 of separator 48 is resiliently compliant with respect to surface 64, roller 52 may apply larger normal force N to stack 24 to reduce the likelihood of a mispick of low friction media without substantially increasing the likelihood of a multi-pick of high friction media. In particular, the application of a larger normal force by roller 52 reduces the likelihood of a mispick with low friction media sheets. At the same time, surface 70, against which the leading edges 74 of the low friction sheets 22 abut, has a sufficient coefficient of friction with such leading edges of low friction sheets to separate sheet 22a from sheet 22b to avoid a multi-pick.

Without resilient compliancy, during picking of sheets having a relatively high coefficient of friction with surface 70 and with one another, the coefficient of friction of surface 70 may otherwise prevent the picking of the top sheet 22a (i.e., a mispick) and the larger normal force may alternatively result in the underlying sheet 22b being moved with sheet 22a, resulting in a multi-pick. However, being generally stiffer or heavier, the high friction sheets move surface 70 against bias 72 which results surface 70 deflecting or otherwise moving rearwardly to facilitate picking of the top sheet 22a. The larger normal force N applied by roller 52 results in a directly proportional larger pick force $F_p$ applied directly to the top sheet 22a which is sufficient to overcome the rearwardly deflected surface 70 to reduce the likelihood of a mispick.

At the same time, movement of surface 70 against bias 72 results in bias 72 applying a larger separation force to sheet 22b due to the resiliency of bias 72 which enhances separation of sheet 22a from sheet 22b. This larger separation force applied by bias 72 sheets 22 enlarges as surface 70 is further moved against bias 72. In effect, the resilient nature of bias 72 and surface 70 provide a separation force which varies depending upon the degree of movement or deflection of surface 70 which is in turn dependent upon the stiffness or coefficient of friction of the media being picked. Upon sufficient movement of surface 70, the leading edges 74 of sheets 22 are additionally brought into engagement with surface 64 which applies even additional separation force to reduce the likelihood of a multi-pick.

Rotation of roller 52 by rotary actuator 54 moves leading edge 74 of sheet 22a across surface 62 and into media path 30. Thereafter, roller 78 drives sheet 22a against guide surface 76 and across platen 82. Media interaction device 32 interacts with sheet 22a. Upon being interacted upon, sheet 22a is further driven to output 34.

Figure 3:
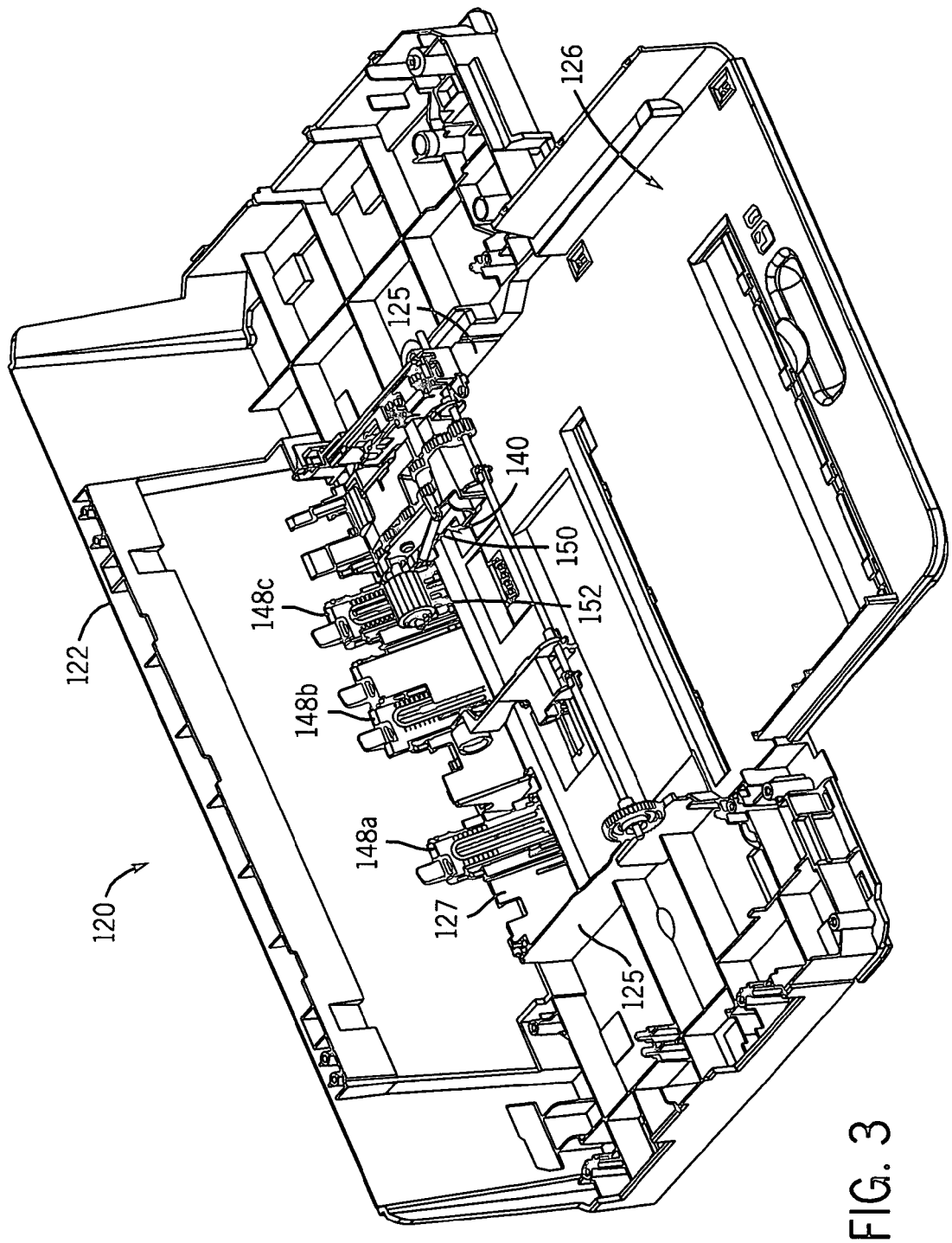
FIG. 3 is a front perspective view of another embodiment of the media interaction system of FIG. 1 according to an example embodiment.
Figure 4:
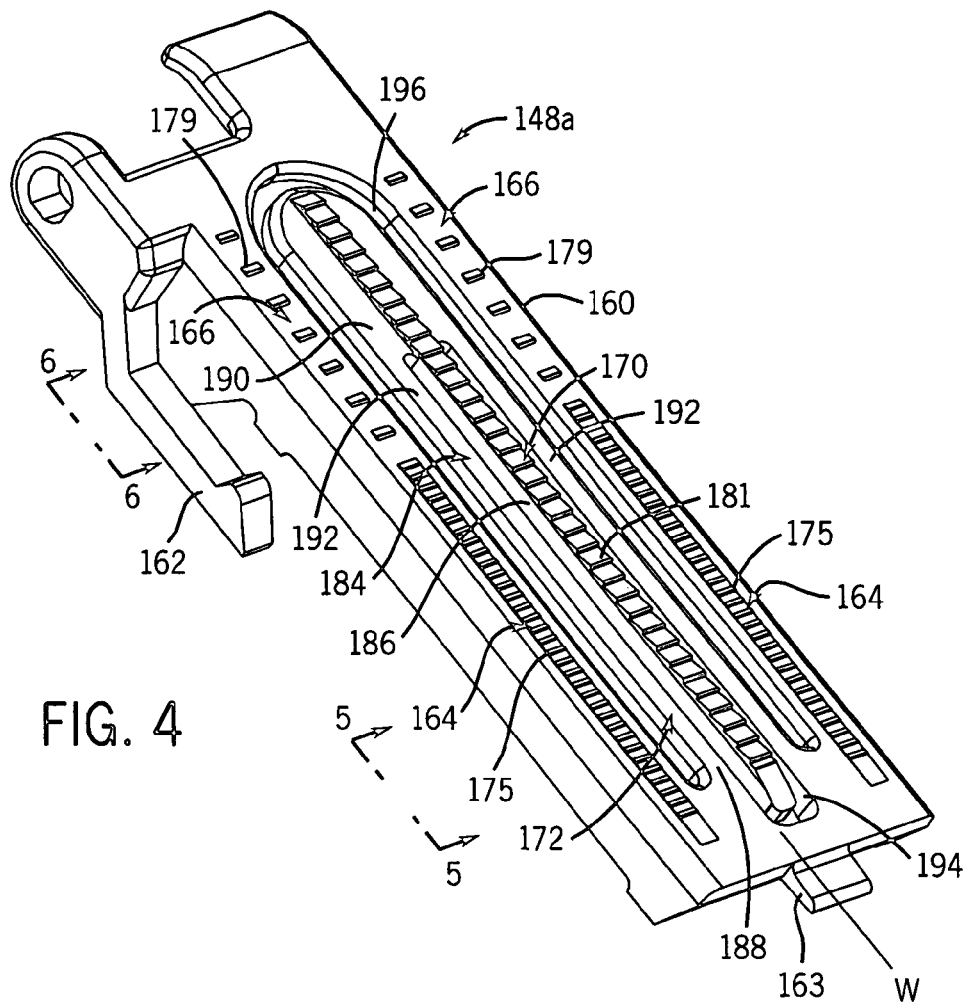
FIG. 4 is an enlarged perspective view of the separator of the system of FIG. 3 according to an example embodiment.

FIG. 3 illustrates media interaction system 120, a particular embodiment of media interaction system 20 shown in FIG. 1. As shown by FIG. 3, media interaction system 120 includes frame 122, media support surface 126 and media pick system 128. Media interaction system 120 additionally includes media path 30, media interaction device 32 and output 34 shown and described with respect to FIG. 1. Frame 122 comprises one or more structures configured to support media pick system 128. In one embodiment, frame 122 may additionally be configured to guide insertion of a stack of media into engagement with media pick system 128. As shown by FIG. 4, frame 122 generally projects upwardly from media support surface 126 and includes sides 125 and separator support 127. Sides 125 guide insertion of media into system 120 while support 127 supports portions of media pick system 128. In the particular example illustrated, sides 125 and separator support 127 are integrally formed as part of a single unitary body with one another and with media support surface 126. In other embodiments, sides 125 and separator support 127 may alternatively be fastened, bonded, glued, welded or otherwise coupled to one another in other fashions. In other embodiments, frame 122 may have other configurations.

Media support surface 126 comprises a surface configured to support a stack of media in position with respect to media pick system 128. Although media support surface 126 is illustrated as being substantially horizontal, in other embodiments, media support surface 126 may alternatively be inclined. Although media support surface 126 is illustrated as having various contours such as various projections and depressions, in other embodiments, media support surface 126 may alternatively be substantially flat.

Media pick system 128 comprises a device configured to pick an uppermost sheet from a stack of sheets resting upon media support surface 126. Media pick system 128 generally includes media pick device 140 and media separators 148a, 148b and 148c (collectively referred to as media separators 148). Media pick device 140 comprises a device configured to engage and apply force to a top or outermost sheet of a stack of media supported by media support surface 126. Media pick device 140 includes arm 150, pick roller 152 and rotary actuator 54 (shown and described with respect to FIG. 1). Arm 150 comprises an elongate structure configured to pivot about axis 156 while rotatably supporting roller 152. Arm 150 pivotally supports roller 152 about axis 156 to enable roller 152 to accommodate different stack thicknesses.

Roller 152 comprises a generally cylindrical member configured to engage the top or outermost sheet. Roller 152 is operably coupled to rotary actuator 54 (shown in FIG. 1) so as to be rotatably driven and so as to transmit force to the top or outermost sheet of the stack of media. In the particular embodiment illustrated, roller 152 has an outer surface 158 configured to frictionally engage a top or outermost sheet of media to transfer force to the media. In one embodiment, surface 158 comprises an elastomeric material such as a natural or synthetic rubber. In still other embodiments, surface 158 may be formed from other materials or may be configured to transfer force to the top or outermost sheet of media in other fashions.

Separators 148 comprise devices configured to reduce the likelihood of a multi-pick and also to reduce the likelihood of a mispick. Because media pick system 128 includes multiple separators 148, separators 148 engage an underlying sheet at multiple locations, enhancing the effectiveness of separators 148. In the particular example illustrated, separators 148 are substantially uniformly distributed across surface 126 so as to be spread across a larger width of the media being picked. As a result, damage to media brought about by concentrated engagement of media may be reduced. In other embodiments, separators 148 may be dissimilar from one another and may be none uniformly located across surface 126. Although media pick system 128 is illustrated as including three separators 148, in other embodiments, media pick system 128 may include fewer or greater than three separators 148.

FIGS. 4-7 illustrate one of separators 148 in more detail. FIG. 4 is an enlarged perspective view illustrating separator 148a in more detail. Separator 148a is substantially identical to separators 148b and 148c. As shown by FIG. 4, separator 148a generally includes body 160, mounts 162, 163, surfaces 164, surfaces 166, surface 170, and bias 172. Body 160 comprises a structure configured to serve as a foundation for surfaces 164 and 166. Body 160 further supports bias 172 which, in turn, supports surface 170. In the particular example illustrated, body 160 is formed from a rigid polymeric material such as acetal. In other embodiments, body 160 may be formed from one or more other materials and have various others sizes, shapes and configurations.

Mounts 162 and 163 comprise structures configured to releasably or removably secure and retain separator 148a to support 127 (shown in FIG. 3). In the particular example illustrated, mounts 162 comprise arms extending from opposite sides of body 160 and configured to wrap about separator support 127 so as to hook separator 148a onto support 127.

Mount 163 comprises a pin, tab or other projection configure to be position within a corresponding slot or opening (not shown) formed in surface 126 proximate to support 127. Mount 163 secures separator 148a in a predetermined position along support 127. As a result, separator 148a may be removed and repositioned at various locations along separator support 127 without tools to accommodate differently sized media sheets.

Although separator 148a is illustrated as including mounts 162 and 163 which comprise a pair of hooks and a projection, in other embodiments, separator 148a may alternatively include other structures or mechanisms configured to releasably secure and retain separator 148a with respect to support 127 and surface 126. In yet other embodiments, separator 148a may alternatively be secure to support 127 by one or more fasteners, adhesives, welds or other interlocking mechanisms. In still other embodiments, separator 148a may be integrally formed as part of a single unitary body with support 127 or other structures associated with the frame 122.

Surfaces 164 comprise surfaces configured to engage leading edges of sheets of media supported upon support surface 126 (shown in FIG. 3). Surfaces 164 extend along a face of separator 148a generally nonparallel to media support surface 126 and on opposite sides of surface 170. Surfaces 164 extend generally behind or rearward of surface 170 prior to movement of surface 170. In one embodiment, surfaces 164 extend substantially proximate to media support surface 26. In other embodiments, surface 64 may be spaced vertically above media support surface 26.

In the particular example illustrated, surfaces 164 extend at an obtuse angle with respect to media support surface 126 such that leading edges 74 of sheets 22 of stack 24 are staggered or fanned along surfaces 164 upon deflection of surface 170 to enhance subsequent separation of such sheets. In one embodiment, surfaces 164 are inclined at an angle of at least about 45 degrees and less than 90 degrees such that surfaces 164 are angularly spaced from media support surface 126 greater than 90 degrees and less than or equal to about 105 degrees. In one embodiment, surfaces 164 are angularly spaced from media support surface 126 by about 120 degrees. In still other embodiments, surfaces 164 may be angularly spaced from media support surface 126 by other angles.

Surfaces 164 are configured to have a lower coefficient of friction with leading edges 74 of sheets 22 as compared to surface 170. In one embodiment, surfaces 164 include teeth 175 formed on body 160 on opposite sides of bias 172. Teeth 175 engage leading edges 74 of sheets 22 (shown in FIG. 1) after deflection of surface 170 to further increase the separation force applied by separator 148a to reduce the likelihood of a multi-pick. In other embodiments, surfaces 164 may be provide with other surface irregularities or may be provided with elastomeric media engaging portions of providing surfaces 164 an appropriate coefficient of friction with the leading edges of such media sheets.

Surfaces 166 are similar to surfaces 164 except that surfaces 166 have a lower coefficient of friction with leading edges of media as compared to surfaces 164. In the example illustrated, surfaces 166 include teeth 179. Teeth 179 provide surfaces 166 with an appropriate coefficient of friction sufficient to provide an appropriate separation force for sheets of media having a lower coefficient of friction with one another, such as photo media, which may be supported on an additional photo tray generally above surfaces 164. In one embodiment, teeth 179 have a greater density or greater spacing as compared to teeth 175. In other embodiments, teeth 179 may alternatively have an increased rake angle as compared to surfaces 164. In still other embodiments, surfaces 166 may be provided with other surface irregularities or elastomeric materials to provide surfaces 166 with an appropriate coefficient of friction.

In other embodiments, surfaces 166 may alternatively have a greater coefficient of friction with leading edges of media in those circumstances where the individual sheets have a higher coefficient of friction with one another or have a higher coefficient of friction with pick device 174, increasing the likelihood of a multi-pick and decreasing the likelihood of a mispick. Because separator 148a includes surfaces 164 and 166 having distinct coefficient of friction with leading edges of media, separator 148a may facilitate separation of multiple kinds of media supported by multiple support surfaces. In other embodiments where a single media support surface supplying a single type of media is used, surfaces 166 may be omitted.

Surface 170 comprises a movable surface along a face of separator 148a between surfaces 164 and 166 configured to contact and engage leading edge 74 of sheets. Surface 170 is movable between a first position in front of or forward of surfaces 164 and 166 and a second position substantially coplanar or rearward of surfaces 164 and 166.

Surface 170 has a coefficient of friction with leading edges 74 of sheets 22 that is larger than the coefficient of friction of surfaces 164 with leading edges 74 of sheets 22. As a result, surface 170 is more likely to retain sheet 22b against movement with sheet 22a. In one particular embodiment, surface 170 includes teeth 181. Teeth 181 provide surface 170 with a greater coefficient of friction as compared to surfaces 164 and 166.

Figure 5:
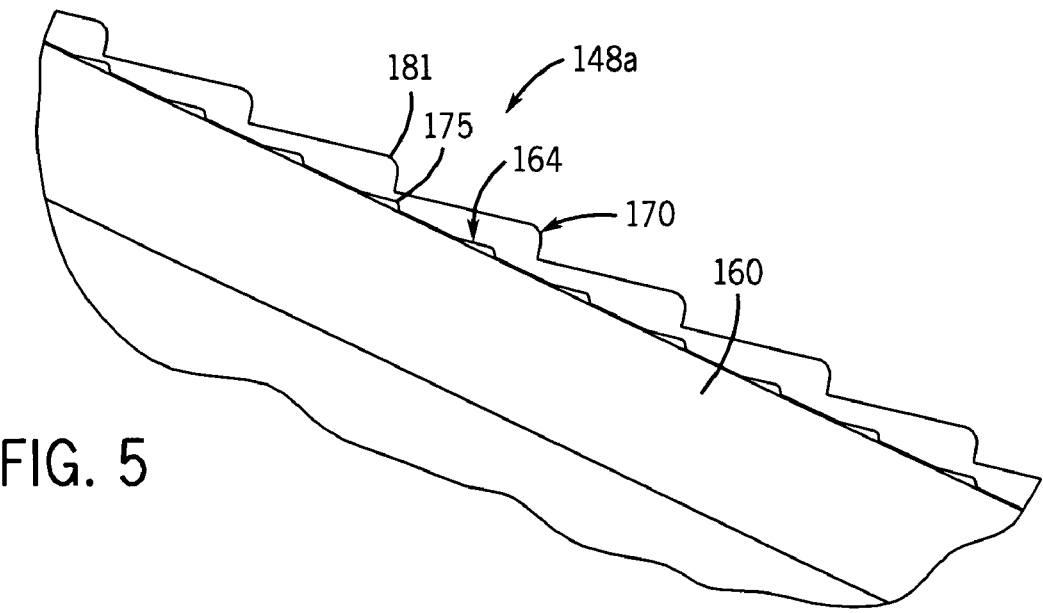
FIG. 5 is an enlarged fragmentary side elevational view of the separator of FIG. 4 taken along line 5-5 according to an example embodiment.
Figure 6:
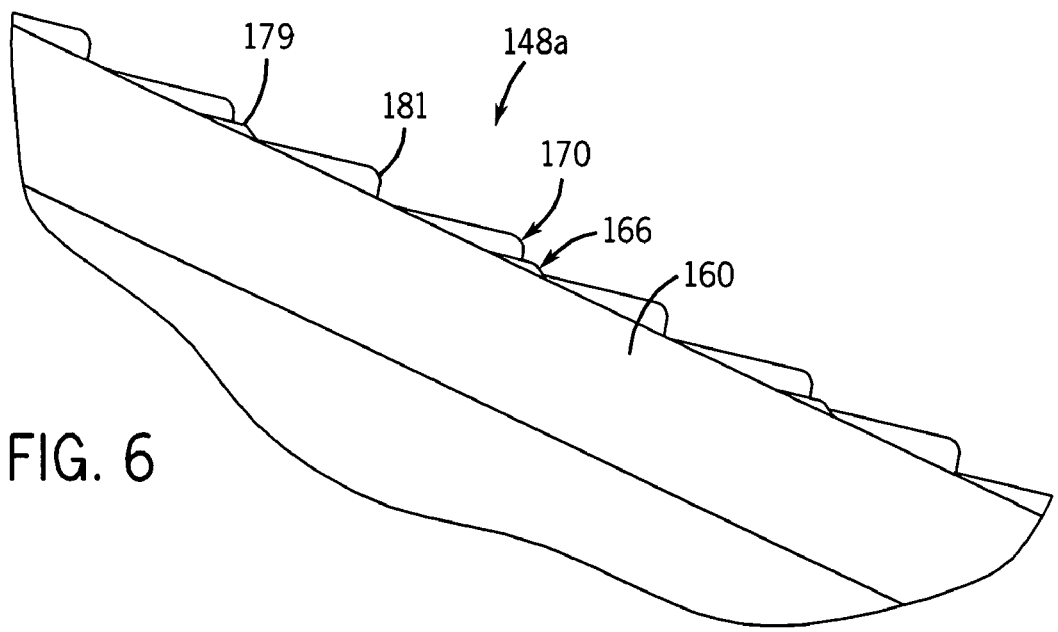
FIG. 6 is an enlarged side elevational view of the separator of FIG. 4 taken along line 6-6 according to an example embodiment.

FIGS. 5 and 6 illustrate teeth 181 in more detail. As shown by FIG. 5, teeth 181 have a rake angle less than or substantially equal to that of the rake angle of teeth 175. In the particular example illustrated, teeth 181 have substantially the same rake angle as that of teeth 175. As shown by FIG. 5, teeth 181 have a height greater than the height of teeth 175. As a result, teeth 181 provide surface 170 with a greater coefficient of friction with leading edges 74 of sheets 22 (shown in FIG. 2) to reduce likelihood of a multi-pick. As shown by FIG. 6, teeth 181 have a rake angle greater than that of teeth 179 and also have a greater pitch as compared to the pitch of teeth 179. Upon deflection of surface 170 two day position behind or coplanar with surface 166, teeth 179 of surface 166 provide an increased separation force to a lesser extent as compared to teeth 175 of surfaces 164.

According to one example embodiment, teeth 175 each have a height of approximately 10 micrometers, a width of about 1.23 mm, a rake angle of between about 13 degrees and 17 degrees and nominally 15 degrees, and a pitch of about 33 teeth/22 mm. Teeth 175 extend in rows along body 160 for a distance of about 22 mm. Teeth 179 have a height of approximately 10 μm, a width of about 1.23 mm, a rake angle of between about 58 degrees and 62 degrees and nominally 60 degrees and a pitch of about 7 teeth/14 mm. Teeth 179 extend in rows along body 160 for a distance of about 14 mm. Teeth 181 have a height of approximately 115 μm, a width of about 1.5 mm, a rake angle of between about 13 degrees and 17 degrees and nominally about 15 degrees, and a pitch of about 35 teeth/37.5 mm. Teeth 181 extend in a row along surface 170 for a distance of about 37.5 mm. In other embodiments, teeth 175, 179 and 181 may have other longitudinal extents and may have other individual characteristics.

Bias 172 comprises a device configured to resiliently bias surface 170 and teeth 181 towards a forward most position in which teeth 181 project beyond surface 164 so as to engage leading edges 74 of sheets 22 (shown in FIG. 1) prior to engagement of such edges with surfaces 164 or 166. According to one embodiment, bias 172 supports teeth 181 and surface 170 forward of surface 164 by a distance (measured perpendicularly from surface 164) of between about 0.2 and 0.3 mm. As a result, for the additional separation force provided by surfaces 164 (or surfaces 166 for other media), surface 170 deflects through a distance of 0.2 mm to 0.3 mm. This distance is sufficient to reduce the likelihood of accidental engagement of sheets with surfaces 164 or 166 but is small enough such that bias 172 experiences a reduced level of fatigue over time, increasing the useful life of separator 148a.

Figure 7:
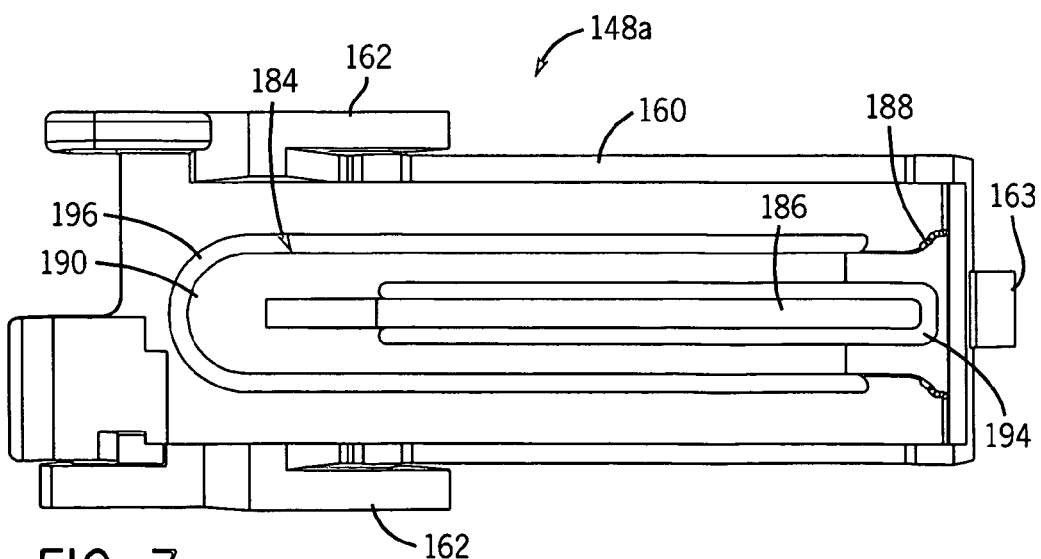
FIG. 7 is a bottom plan view of the separator of FIG. 4 according to an example embodiment.

As shown by FIGS. 4 and 6, bias 172 generally includes tongue 184 and extension 186. Tongue 184 extends from body 160 between surfaces 166. Tongue 184 includes base 188, tip 190 and legs 192. Base 188 comprises the root at which tongue 184 extends from body 160. As shown by FIG. 7, illustrating a rear side of separator 148a, base 188 includes flared ends with additional mass or material. This additional mass or material reinforces a junction between body 160 and tongue 184. Because base 188 has such reinforcement, base 188 better supports the face of tongue 184 parallel to the face of body 160. As a result, teeth 181 of surface 170 remain uniformly spaced from leading edges of sheets and are in substantially uniform contact with leading edges of sheets upon support surface 126 (shown in FIG. 3). In addition, the reinforcement provided by base 188 also assists in maintaining the undeflected position of tongue 184 over time after repeated deflections of tongue 184. In other embodiments, base 188 may be reinforced by other reinforcement structures such as ribs and the like.

Tip 190 comprise the end portion of tongue 184. Tip 190 supports teeth 181 of surface 170 generally opposite to surfaces 166. Tip 190 further cantilevers extension 186 between legs 192.

Legs 192 extend between base 188 and tip 190. Legs 192 resiliently cantilever tip 190 with respect to base 188 and body 160 within an outer slot 196. Legs 192 are spaced apart one from another by an internal slot 194 in which extension 186 extends. In one embodiment, slot 194 has a width W sufficiently small so as to reduce damage to leading edges of sheets being urged between legs 192 by the media pick device. In one embodiment, slot 194 as a width W of less than or equal to about 5 mm and nominally about 3 mm. In other embodiments, slot 194 may have other dimensions.

Extension 186 is resiliently cantilevered from tip 190 and supports teeth 181 of surface 170. Because teeth 181 of surface 170 proximate base 188 are resiliently cantilevered from tongue 184 and because tongue 184 is resiliently cantilevered from body 160, bias 172 has a more uniform spring constant or deflection characteristic from end to end. In one embodiment, extension 186 has a length of about 28 mm. Slot 196 as a length of about 37.5 millimeters. These dimensions of the double-cantilevered configuration of bias 172 have been found to provide deflection characteristics which are well-suited for providing an appropriate separation force and an appropriate degree of compliance to reduce mispicks and multi-picks of most media types.

In the example embodiment illustrated, separators 148 each permit the normal force applied by the pick roller to be increased to at least 150 grams and nominally up to 170 grams before the rate of multipicks substantially increases. As compared to rubber pads, surface 170 of separators 148 have lower deflection force and a larger offset. In other embodiments, the length of extension 186 or the length of slot 196 may be increased or decreased to vary deflection characteristics of bias 172 depending upon types of media to be picked.

In a particular embodiment illustrated, the separators 148 are each integrally formed as a single unitary body with appropriate dimensions and from an appropriate material such that tongue 184 and extension 186 are resiliently cantilevered with respect to body 160. In one embodiment, separators 148 are each integrally formed as a single unitary body from a polymeric material such as acetal for simpler manufacturing and lower cost. In other embodiments, separators 148 may be formed from other polymeric materials. In yet other embodiments, separator 148 may be formed from separate components or elements which are fastened, welded, bonded or otherwise joined together.

Overall, like media interaction system 20, media interaction system 120 facilitates separation of a top or outermost sheet from a stack of sheets. In particular, teeth 181 of surface 170 provide a sufficiently large coefficient of friction with edges of sheets to reduce the likelihood of multi-picks of sheets of media having a lower coefficient of friction. At the same time, bias 172 provides surface 170 with resilient compliance such that surface 170 deflects when the top or outermost sheet being driven by the pick device is not initially released by teeth 181, such as with the sheet having a higher coefficient of friction with separator 148. This deflection of surface 170 increases the likelihood that the top outermost sheet will be released, reducing the likelihood of a mispick. This deflection results in a greater separation force being applied to underlying sheets and also results in such underlying sheets being additionally brought into engagement with surfaces 164 (or surfaces 166 when the media is supported on an elevated media support surface), reducing the likelihood of a multi-pick of sheets of media having a higher coefficient of friction.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A separator comprising:
    a first surface configured to engage edges of sheets;
    a second surface configured to engage the edges of sheets upon movement of the first surface; and
    a bias coupled to the first surface and configured to resiliently bias the first surface in a direction away from the second surface.

2. The separator of claim 1, wherein the first surface and the second surface have different coefficients of friction with the edges of the sheets.

3. The separator of claim 1 wherein the first surface has a first coefficient of friction with the edges and wherein the second surface has a second lesser coefficient of friction with the edges.

4. The separator of claim 1, wherein the first surface includes teeth.

5. The separator of claim 1, wherein the first surface and the second surface are integrally formed as part of a single unitary body.

6. The separator of claim 1, wherein the first surface, the second surface and the bias are integrally formed as part of a single unitary body.

7. The separator of claim 1, wherein the first surface includes first irregularities having a first height and wherein the second surface includes second irregularities having a second height less than the first height.

8. The separator of claim 1, wherein the first surface and the second surface include teeth.

9. The separator of claim 1 further comprising a third of surface spaced from the second surface and configured to engage the edges of the sheets, wherein the bias is configured to resiliently bias the first surface in a direction away from the third surface.

10. The separator of claim 9, wherein the bias is configured to resiliently deform during movement of the first surface.

11. The separator of claim 1 further comprising a body supporting the second surface, wherein the bias comprises a first extension resiliently cantilevered from the body and supporting the first surface.

12. The separator of claim 11, wherein the bias includes a second extension resiliently cantilevered from the body and supporting the first extension.

13. The separator of claim 12, wherein the second extension is reinforced at a junction of the second extension and the body.

14. The separator of claim 1, wherein the first and second surfaces are configured to engage the sheets prior to the sheets being printed or scanned by a media interaction device.

15. The separator of claim 1, wherein the first and second surfaces are configured to engage the sheets prior to the sheets being printed upon by an inkjet printer.

16. The separator of claim 1, wherein the first surface and the second surface are inclined.

17. An imaging device comprising:
    a media interaction device; and
    a separator configured to separate sheets prior to movement of one of the sheets to the media interaction device, the separator comprising:
    a first surface configured to engage edges of sheets;
    a second surface configured to engage the edges of sheets upon movement of the first surface; and
    a bias coupled to the first surface and configured to resiliently bias the first surface in a direction away from the second surface.

18. The imaging device of claim 17, wherein the media interaction device comprises a scanner or a print engine.

* * * * *